Sept. 7, 1948.       D. E. GAMBLE       2,448,879
FRICTION CLUTCH PLATE
Filed June 12, 1937                2 Sheets-Sheet 1
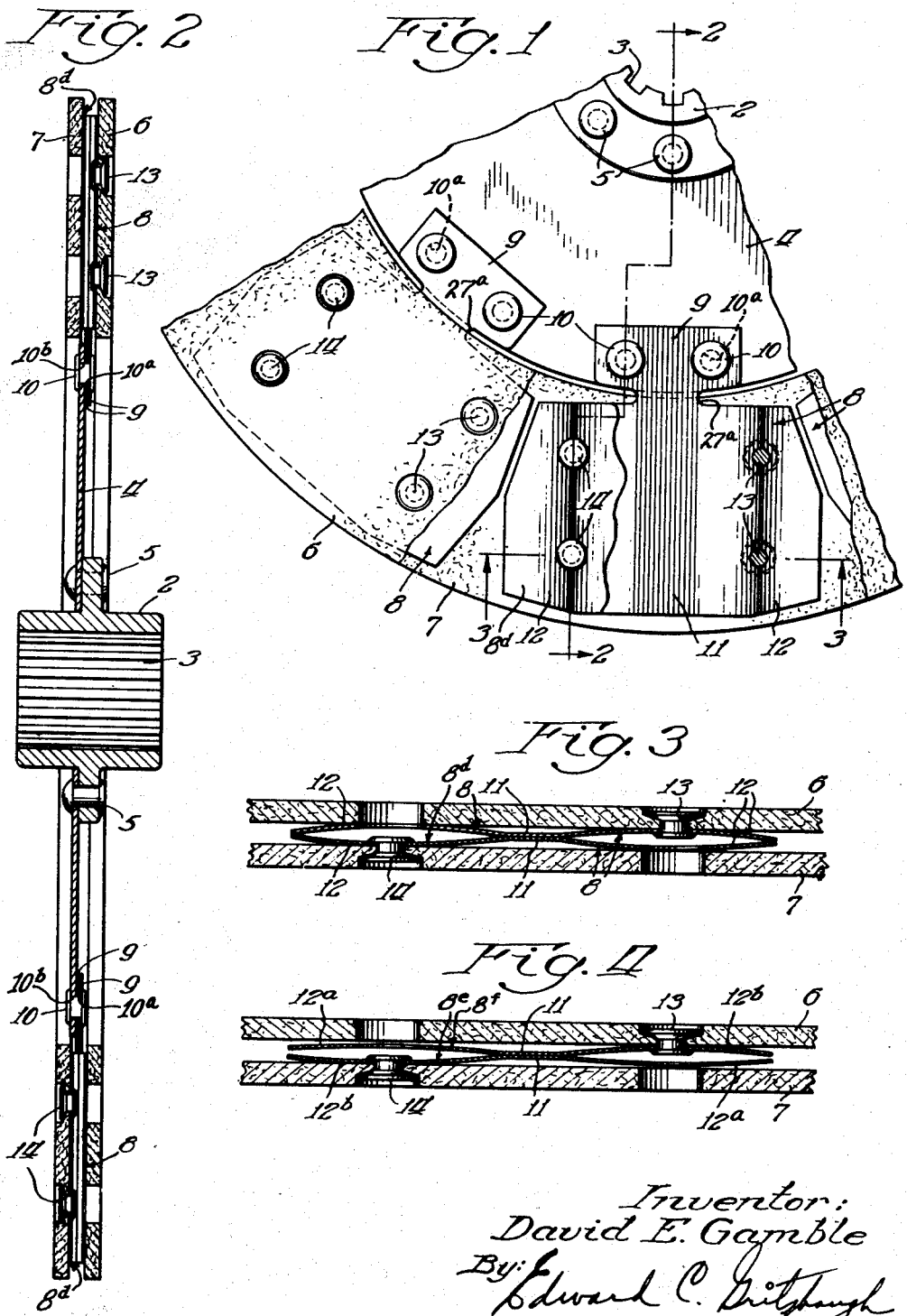
Inventor:
David E. Gamble Sept. 7, 1948.   D. E. GAMBLE   2,448,879
FRICTION CLUTCH PLATE
Filed June 12, 1937   2 Sheets-Sheet 2
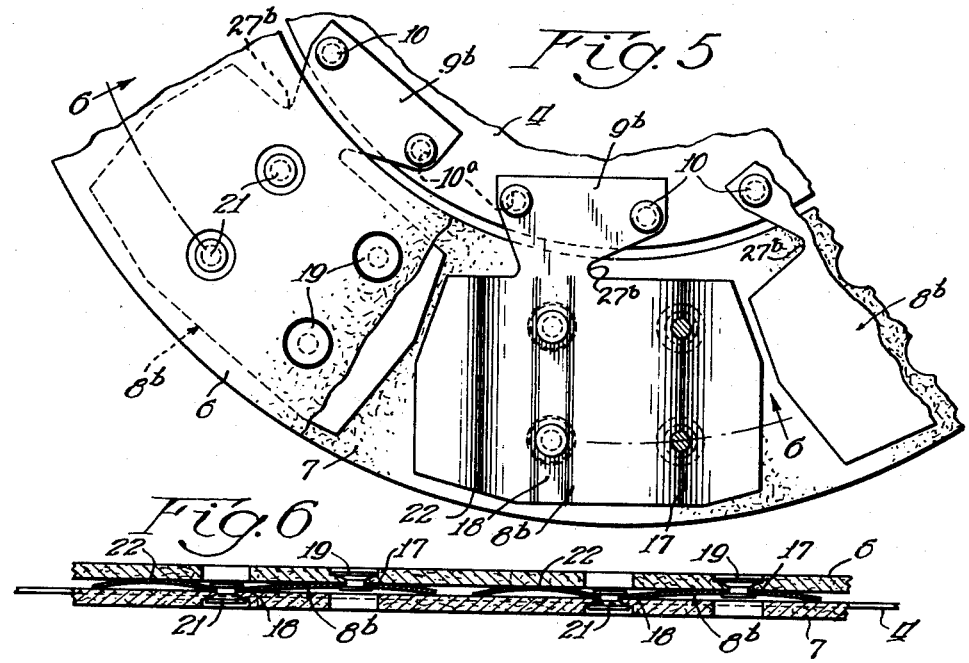
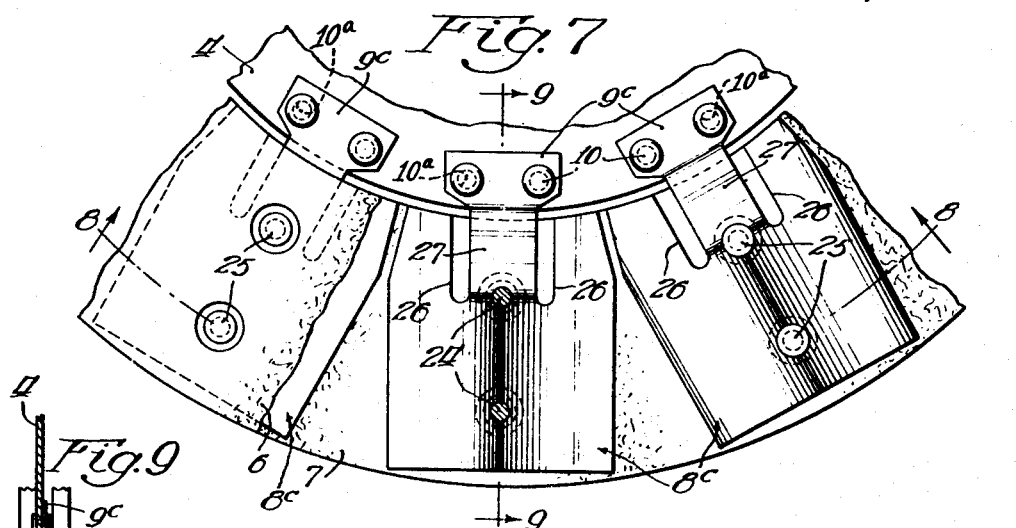
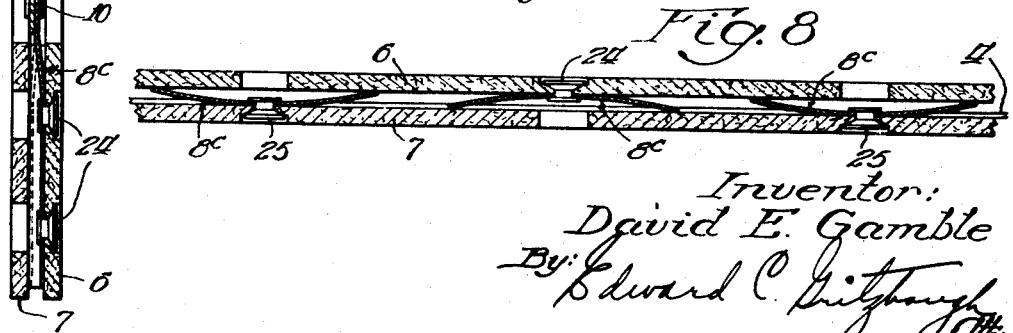
Inventor:
David E. Gamble
By: Edward C. Gitgough
Atty.

Patented Sept. 7, 1948

2,448,879

UNITED STATES PATENT OFFICE 2,448,879

FRICTION CLUTCH PLATE

David E. Gamble, Chicago, Ill., assignor to Borg-Warner Corporation, Chicago, Ill., a corporation of Illinois Application June 12, 1937, Serial No. 147,936

7 Claims. (Cl. 192—107)

My invention relates to improvements in friction clutch plates, and more particularly to clutch plates of the so-called "cushion" type comprising the driven assembly of a friction clutch.

It has become a practice in the art of friction clutches to construct the driven assembly, or friction clutch plate, in such manner as to support the friction facings thereof yieldingly upon the relatively rigid hub-disc assembly of the plate, thus to permit the friction facing supports to yield during compression of the plate in such manner that the friction facings, without undergoing change in shape, may adjust themselves to the friction engaging surfaces of the clutch drive assembly. In my earlier U. S. Letters Patent Nos. 1,652,005–6–7, I have disclosed clutch plates of the above described type in which the outer regions of the clutch discs are fashioned to provide a plurality of relatively yielding cushions upon which the friction facings are supported. During compression of the plate such facings were capable of moving bodily, without distortion, relatively toward one another.

Later, clutch plates were constructed and adapted to commercial use in which independent relatively light steel spring cushions were mounted upon the outer side wall of the clutch disc, and in turn supported at least one of the friction facings. Such plates possessed the advantage of providing any desired resistance to facing movement during compression of the plate by the simple expedient of choosing, at the time of manufacture, cushions of proper resiliency, both disc and cushions being formed from but two dies.

Such clutch plates as I have described, however, because the relatively heavy metal of the clutch disc extended to the outer periphery of the finished plate, possess what I choose to call relatively high "spinning inertia." Stated in other words, the relatively high rotating mass of the peripheral portion of the plate brought about a delay in the shifting of transmission gears, as from one speed through neutral to another speed, because the "spinning inertia" of the plate with the clutch disengaged caused the plate with the relatively moving parts of the transmission to decelerate slowly and to delay synchronism of the engageable transmission gears. This objection was particularly noticeable before the introduction of synchromesh transmissions.

It is an object of my present invention, therefore, to provide an improved clutch plate having all the advantages of the independent steel spring cushion plate as to pre-selection of cushion resistance, and in addition thereto, to provide a plate which possesses a relatively low "spinning inertia" so that the plate may decelerate quickly, thus to facilitate the quickening of transmission gear shift.

Another object of my invention is to provide an improved friction clutch plate in which the friction facings and their cushion supporting instrumentality is such as to provide for bodily movement of the two friction facings, one relatively to the other, and both relative to the disc.

These features are ones which assure complete surface to surface engagement between the facings and their friction engaging surfaces of the driving assembly, as well as the correction of slight misalignment between the plane of the body of the disc and the plane of rotation of the driving assembly.

Another object is to provide an improved friction clutch plate which is simple in construction, and which may be manufactured at a relatively low cost.

Another object of the invention is to provide an improved friction clutch plate in which the spinning inertia is greatly reduced as compared to prior plates, without sacrificing torsional load carrying capacity. To this end, the invention contemplates a friction clutch plate including a hub, a mounting disc mounted on said hub, comprising a substantially circular central disc portion of sheet metal of such thickness as to be substantially unyielding and to adequately withstand the torque loads imposed upon it during clutch operation, and a peripheral region having a low rotational inertia, said peripheral region comprising a plurality of yieldable cushion members of materially lesser thickness and weight per unit area than said disc portion, spaced from the periphery of said disc portion, neck members, of reduced circumferential width compared to that of said cushion members, joining said cushion members to the disc portion, and friction facings embracing and secured to said cushion members.

Other objects, advantages and uses of the invention will be apparent after reading the following specification and claims, and after consideration of the drawings forming a part of the specification, in which Fig. 1 is a fragmentary face elevation of a clutch plate constructed in accordance with my invention;

Fig. 2 is a cross sectional view substantially along the line 2—2 of Fig. 1;

Fig. 3 is a sectional view along the line 3—3 of Fig. 1;

Fig. 4 is a view similar to Fig. 3 of a modified form of the cushion;

Fig. 5 is a view similar to Fig. 1 of another form of my improved clutch plate;

Fig. 6 is a sectional view along the line 6—6 of Fig. 5;

Fig. 7 is a view similar to Fig. 1 of another form of my improved clutch plate;

Fig. 8 is a sectional view along the line 8—8 of Fig. 7; and

Fig. 9 is a sectional view along the line 9—9 of Fig. 7.

With reference to Figs. 1 to 3 inclusive, I have illustrated therein a friction clutch plate of the type intended for use in the friction clutch, or so-called "engine clutch" of a motor vehicle.

The clutch plate illustrated may comprise a hub 2, having splines 3 for engagement with the complementarily splined portion of a transmission shaft (not shown), a circular mounting plate 4 of sheet steel secured, as by rivets 5, to the hub 2 and of an outside diameter notably less than the overall diameter of the complete clutch plate and annular friction facings, of which there are two in number and indicated at 6 and 7 respectively, preferably of an internal diameter greater than the outer diameter of the disc 4. The facings 6 and 7, it will be noted, are located concentrically of the disc 4 in parallel relationship to one another and to the plane of the body of the disc 4.

Each of the facings 6 and 7 are drivingly connected with the hub and disc assembly 2—4 through the medium of a plurality of sets of resilient cushions 8 and 8d, respectively, arranged in pairs in annular array about the axis of the hub 2, each pair of cushions in close end to end relationship with the next adjacent pair (see Fig. 1). The resilient cushions 8 constitute one set or row of cushions and the resilient cushions 8d constitute another set or row, with the cushions of one row being axially offset and cooperating with the cushions of the other row to provide for relative axial movement of the friction facings under clutch packing pressure.

Each of the cushions 8 and 8d is of general T-shaped configuration and is formed with an integral tab or foot 9 at its radially inward edge, the tab 9 being connected to the horizontally extending head or cushion portion by a narrow neck portion 27a of substantially less circumferential width than either the cushion portion or the tab 9. The tabs 9 of each pair of cushions 8 and 8d are secured firmly by rivets 10 to the peripheral portion of the disc 4, both tabs 9 being located preferably on one side of the disc and the rivets 10 extend through suitable openings 10a and 10b in the tabs and disc, respectively. The centers of the openings 10a and 10b lie upon radii disposed on either side of the neck portion 27a. With reference to Fig. 3, each of the cushions are formed with their central portions flat, as indicated at 11, and with their circumferentially extending end portions, or wings bowed, as indicated at 12, in such manner that the concave sides of the bowed wing portions face each other and the facings 6 and 7 may rest directly upon the concave sides or crowns of the bowed cushion portions, the intermediate and flat portions 11 of the cushions being in contact with one another and in spaced relationship to the adjacent surfaces of each of the friction facings (see Fig. 3). The facing 6 may be secured to each of one of the cushions 8 by rivets 13 which extend through the facing 6 and through one of the bowed portions 12, and the facing 7 may be secured to each one of the cushions 8d by similar rivets 14 extending through the facing 7 and through that one of the bowed portions 12 which is diagonally out of register with the adjacent rivet 13, as viewed in Fig. 3 the attachment of the cushions 8 and 8d to their associated facings 6 and 7, in this manner, maintains the facings in substantially parallel relation, free from axial distortion.

A clutch plate constructed as herein described presents yielding resistance to bodily movement of the facings relatively toward one another, such resistance being provided by the bowed portions of the pairs of cushions 8 and 8d. Should slight misalignment demand bodily and collective movement of the facings relatively to the disc 4, such movement or accommodation may take place, although in a properly constructed clutch plate and clutch driving assembly, such error in alignment does not frequently occur. During clutch engagement, the cushions may spread out circumferentially. This advantage, which is the result of the arrangement of the rivets 13 and 14 relative to the cushions, prevents any internal stresses within the cushion members which might otherwise impair efficient cushion operation, and which in time might result in mutilation of the cushions.

My improved clutch plate possesses relatively high torque transmitting characteristics, since each of the cushion members is secured firmly to one of the facings, and each cushion member is firmly fixed by a plurality of rivets 10 to the disc 4. There is no tendency of the cushions to yield circumferentially, since the torque transmitted between facing and hub assembly is transmitted edgewise substantially through the plane of the bodies of the cushions, and this is particularly so during complete engagement of the clutch when the cushions are compressed to their reasonable operative limit.

The major advantage attained by the clutch plate herein described is the presentation of low "spinning inertia," since the mass of the relatively thin steel cushions 8 and 8d is considerably less than would be the mass of the disc 4 were it extended to the outer periphery of the plate, or were the cushion members substituted for structurally distorted portions of the disc 4 as has been the practice in times past prior to the use of independent spring steel cushions in a manner I have previously described.

The reduction in "spinning inertia" in my improved clutch plate is one that is very noticeable by the increase in rate of deceleration of the clutch plate and transmission drive shaft assembly. This reduction is of such order that shifting of the gears from one speed through neutral to another may take place in noticeably less time without clashing than is possible in clutch plates of typical present construction.

At the same time, the construction and arrangement of the parts is such that the plate has ample torsional load carrying strength. Considering the disc 4 and the cushions 8, 8d, etc., collectively as a mounting plate, the peripheral region of which comprises relatively light thin cushions, it may be pointed out that the torsional load becomes concentrated toward the center of the plate, and the central disc portion thereof is accordingly made relatively heavy and unyielding so as to withstand such concentrated orque loads. The cushions are each secured to the central disc portion at circumferentially spaced points so as to resist any tendency to pivot when subjected to the transmission of torsional load from the facings of the disc, and each cushion is, in addition, secured to a facing at preferably a plurality of points, so as to further resist such pivoting tendencies.

Furthermore, the central disc portion approaches fairly closely to the inner peripheries of the facings, and the points of attachment between the cushion pads and the disc portion are fairly close to the periphery of the disc portion, so as to reduce to a minimum the length of the reduced neck regions connecting the cushions proper to the cushion tabs, and to correspondingly reduce the leverage tending to twist or bend said neck regions under the torque load. As a result, the forces acting on the neck regions are largely shearing forces, which are adequately resisted by the neck regions. It will be understood that the reduced neck regions allow the circumferentially extended cushioning portions to freely flex during clutch engagement, without being hindered by the attachment to the unyielding disc portion of the plate.

In Fig. 4 I have illustrated a modification of the construction of the cushions illustrated in Fig. 1. In this figure the cushions 8e and 8f are constructed identically as to profile to the cushions 8 and 8d, but the bowed portions of each cooperating pair of cushions are formed so that one portion 12a is bowed to a lesser extent than is the opposite bowed portion 12b, and the bowed portion 12a of one of the cushions of each pair is in register with the bowed portion 12b of the opposite cushion of each pair. The rivets 13 and 14 serve to connect the facings 6 and 7 respectively, to the bowed cushion portions 12a and 12b without axial distortion of said facings. This arrangement provides a definite two-stage cushion action during initial compression of the clutch plate. As the plate is first compressed, the facings 6 and 7, which are engaged with the portions 12b only of each of the cushions, are resisted in their movement relatively toward one another and to the plane of the body of the disc 4 by one-half of each of the cushion members, but upon further compression, each of the facings may engage with the portions 12a of the cushions, thus to substantially double the resistance offered by the cushions. This change in resistance takes place at a definite stage in relative facing movement and provides a comparatively light cushion resistance for initial, or "slip clutch engagement," and the desired increase in cushion resistance during the stage just prior to and at full clutch engagement.

In the clutch plate assembly shown in Figs. 1 to 3, and in Fig. 4, respectively, the series of cushions connected with the respective friction facings are engaged during the application of clutch packing pressure, so that the flexible end portions of the T-shaped cushions bend along lines generally coinciding with the sides of the flat regions 11 to permit relative axial movement of the friction facings toward each other.

The clutch driven plate above described and disclosed in Figs. 1, 2, 3 and 4 hereof form the subject matter of a divisional application, Serial No. 22,342, filed by me April 21, 1948.

In Figs. 5 and 6, I have illustrated another form of the cushions, and friction facing supports, 8b, which have a contour popularly known as "flag-shaped." Instead of placing the cushions 8b in pairs between the facings 6 and 7, an annular array of single cushions is employed, each cushion being reversely bowed, as indicated at 17 and 18 in Fig. 6. The bowed portions 17 of each cushion may be secured, as by rivets 19, to the facing 6 and the bowed portions 18 similarly secured, as by rivets 21, to the facing 7, as shown. Increased resistance to compression may be given the cushions 8b by forming additional bowed portions 22 on the same side and remote from the bowed portion 17. Each cushion 8b is fixed securely upon the disc 4 by rivets 10 which extend through the disc and through integral foot portions or tabs 9b extending radially inwardly from one end portion of each cushion. The tabs 9b are connected to the cushions 8b by relatively narrow neck portions 27b.

The clutch plate of Figs. 5 and 6, like that shown in Figs. 1 to 4 inclusive, possesses the advantage of low "spinning inertia," since the metal of the relatively thin spring steel cushions represents the only mass at the peripheral portion of the plate aside from the friction facings which they yieldably support. Collectively the cushions 8b serve non-yieldably to transmit torque from the facings to the disc-hub assembly and to yieldingly resist bodily movement of the parallel friction facings 6 and 7 toward one another and toward the plane of the body of the disc 4.

Referring to Figs. 7 to 9, inclusive, I have disclosed therein another form of the cushion structure wherein an annular array of single cushion members 8c are employed, each cushion being bowed and all arranged so that the convex side of cushions face alternately in opposite directions. The facing 6 is secured by rivets 24 to those cushions presenting their convex sides toward the facing and the facing 7 is secured to the remaining and oppositely disposed cushions on the convex sides thereof by rivets 25. Each cushion has an integral tab 9c extending radially inwardly along the central axis of the cushion, which tabs are riveted, as indicated at 10, on one side of the disc 4, thus securely to fix each cushion to the disc. In this form of the cushion structure, each cushion is slotted inwardly, as shown at 26, on opposite sides of its mid-portion to provide an elongated neck 27 between the tab 9c and the body of the cushion. The neck 27 serves to facilitate lateral displacement of alternate cushions away from the plane of the body of the disc as best shown in Fig. 9, and also increases generally the ability of the facings and cushions, as a unit, to drift laterally relative to the disc 4, as might be required to compensate for misalignment of the driving members of the clutch with which the plate is employed.

While certain embodiments of the invention have been illustrated and described herein, by way of operative examples, it will be understood that the principles of the invention can be embodied in clutch plate assemblies substantially differing in details of construction and arrangement from those disclosed herein, without departing from the spirit of the invention or the scope of the annexed claims.

I claim:

1. A friction clutch element comprising a mounting member of relatively heavy sheet metal, a plurality of spring metal cushions having a substantially lesser weight per unit area than that of said mounting member, occupying an annular region lying beyond the outer radial limit of said mounting member, and each having an integral portion overlapping and securely attached to said mounting member, each of said portions being connected to its respective cushion by a neck region of substantially less width than that of either said attaching portion or the cushion, and friction facings carried by said cushions, in lateral register with said annular region.

2. A friction clutch element comprising a central mounting member, a plurality of resilient sheet metal cushions having a substantially lesser weight per unit area than that of said mounting member, occupying an annular region lying beyond the outer radial limit of said mounting member, and each having an attaching portion overlapping and securely attached to said mounting member, each of said attaching portions being connected to its respective cushion by a neck portion that is particularly characterized by being of substantially less width than that of either said attaching portion or the cushion, and friction facing means carried by said cushions, in lateral register with said annular region.

3. A friction clutch element comprising a hub, a mounting member mounted thereon and projecting radially therefrom, a plurality of structurally independent yieldable cushions having a substantially lesser weight per unit area than that of said mounting member, occupying an annular region lying beyond the outer radial limit of said mounting member and each having a cushioning portion, an integral reduced neck portion, and a foot portion disposed inwardly of said neck portion and securely attached to said mounting member, said neck portion being of substantially less width than either said cushioning portion or said foot portion, and friction facings carried by said cushions, said cushions being disposed between and in yielding engagement with said facings and being permanently deformed axially so as to normally maintain said facings in spaced parallel relationship and to allow compression thereof under packing pressure.

4. A clutch plate assembly, including: a central hub; an annular mounting member carried by said hub in concentric relation to the axis of said hub; a pair of axially spaced annular friction facings disposed radially outwardly of the periphery of said mounting member; and means for supporting said friction facings in torque transmitting relation to said mounting member, said supporting means including a plurality of independent resilient structures extending in a generally radially outward direction from said annular mounting member and between said friction facings, each of said radially disposed resilient structures being particularly characterized by a foot portion overlying and secured to said annular mounting member, a friction facing supporting portion disposed beyond the periphery of said mounting member and attached to one of said friction facings, and an intermediate portion of substantially less circumferential width than either said foot portion or said friction facing supporting portion.

5. A clutch plate assembly as defined in claim 4, in which the foot portions are secured to the annular mounting member at circumferentially spaced points with at least one of said points lying upon a radial line disposed to one side of said intermediate portion.

6. A friction clutch element comprising a central mounting member, a plurality of resilient sheet metal cushions having a substantially lesser weight per unit area than that of said mounting member, occupying an annular region lying beyond the outer radial limit of said mounting member, and each having an attaching portion overlapping and securely attached to said mounting member, each of said attaching portions being connected to its respective cushion by a neck portion that is particularly characterized by being of substantially less width than that of either said attaching portion or the cushion, and friction facings carried by and secured to each of said cushions, in lateral register with said annular region.

7. A clutch plate assembly, including: a central hub; an annular mounting member carried by said hub in concentric relation to the axis of said hub; a pair of axially spaced annular friction facings disposed radially outwardly of the periphery of said mounting member; and means for supporting said friction facings in torque transmitting relation to said mounting member, said supporting means including a plurality of independent resilient structures extending in a generally radially outward direction from said annular mounting member and between said friction facings, each of said radially disposed resilient structures being particularly characterized by a foot portion overlying and secured to said annular mounting member and by a friction facing supporting portion of greater circumferential width than said foot portion disposed beyond the periphery of said mounting member, certain of said resilient structures being attached to one of said friction facings and the others being attached to the other of said friction facings, and each said structure being further characterized by being radially slotted in a region between said foot portion and said supporting portion to provide an intermediate portion of substantially less circumferential width than either said foot portion or said friction facing supporting portion connecting said foot portion with said supporting portion.

DAVID E. GAMBLE.

REFERENCES CITED

The following references are of record in the file of this patent:

UNITED STATES PATENTS

| Number | Name | Date |
|---|---|---|
| 1,656,778 | Desroziers | Jan. 17, 1928 |
| 1,685,983 | Church | Oct. 2, 1928 |
| 1,777,399 | Daukus | Oct. 7, 1930 |
| 1,899,872 | Lane | Feb. 28, 1933 |
| 1,942,029 | Lane | Jan. 2, 1934 |
| 1,971,665 | Tower | Aug. 28, 1934 |
| 1,992,626 | Nutt | Feb. 26, 1935 |
| 2,027,650 | Nutt | Jan. 14, 1936 |
| 2,059,158 | Wemp | Oct. 27, 1936 |
| 2,324,913 | Daukus | July 20, 1943 |